US007899828B2

(12) United States Patent  
de la Iglesia et al.

(10) Patent No.: US 7,899,828 B2
(45) Date of Patent: Mar. 1, 2011

(54) TAG DATA STRUCTURE FOR MAINTAINING RELATIONAL DATA OVER CAPTURED OBJECTS

(75) Inventors: Erik de la Iglesia, Mountain View, CA (US); Rick Lowe, Atherton, CA (US); Ratinder Paul Singh Ahuja, Saratoga, CA (US); Shaun Coleman, Saratoga, CA (US); Samuel King, Los Gatos, CA (US); Ashish Khasgiwala, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 1082 days.

(21) Appl. No.: 10/814,093

(22) Filed: Mar. 30, 2004

(65) Prior Publication Data

US 2005/0132079 A1    Jun. 16, 2005

Related U.S. Application Data

(60) Provisional application No. 60/528,680, filed on Dec. 10, 2003, provisional application No. 60/528,644, filed on Dec. 10, 2003.

(51) Int. Cl.
 *G06F 17/30*    (2006.01)
(52) U.S. Cl. ....................................... 707/741; 707/747
(58) Field of Classification Search ................. 707/741, 707/747
See application file for complete search history.

(56) References Cited

U.S. PATENT DOCUMENTS

| | | | |
|---|---|---|---|
| 4,286,255 A | | 8/1981 | Siy |
| 4,710,957 A | | 12/1987 | Bocci et al. |
| 5,249,289 A | * | 9/1993 | Thamm et al. ............... 707/700 |
| 5,465,299 A | | 11/1995 | Matsumoto et al. |
| 5,479,654 A | * | 12/1995 | Squibb ........................ 707/695 |
| 5,497,489 A | * | 3/1996 | Menne ........................ 707/696 |
| 5,557,747 A | | 9/1996 | Rogers et al. |
| 5,623,652 A | | 4/1997 | Vora et al. |
| 5,768,578 A | | 6/1998 | Kirk |
| 5,781,629 A | | 7/1998 | Haber et al. |

(Continued)

OTHER PUBLICATIONS

Prenell, Bart, "Cryptographic Hash Functions", Proceedings of the 3 rd Symposium on State and Progress of Research in Cryptography, 1993, pp. 161-171.*

(Continued)

*Primary Examiner*—Don Wong
*Assistant Examiner*—Kim T Nguyen
(74) *Attorney, Agent, or Firm*—Patent Capital Group

(57) ABSTRACT

Objects captured over a network by a capture system can be indexed to provide enhanced search and content analysis capabilities. In one embodiment the objects can be indexed using a data structure having a source address field to indicate an origination address of the object, a destination address field to indicate a destination address of the object, a source port field to indicate an origination port of the object, a destination port field to indicate a destination port of the object, a content field to indicate a content type from a plurality of content types identifying a type of content contained in the object, and a time field to indicate when the object was captured. The data structure may also store a cryptographic signature of the object to ensure the object is not altered after capture.

19 Claims, 6 Drawing Sheets

U.S. PATENT DOCUMENTS

| | | | |
|---|---|---|---|
| 5,794,052 | A | 8/1998 | Harding |
| 5,813,009 | A * | 9/1998 | Johnson et al. ............. 707/695 |
| 5,943,670 | A | 8/1999 | Prager |
| 5,995,111 | A | 11/1999 | Morioka et al. |
| 6,026,411 | A * | 2/2000 | Delp ......................... 707/700 |
| 6,078,953 | A | 6/2000 | Vaid et al. |
| 6,094,531 | A | 7/2000 | Allison et al. |
| 6,108,697 | A | 8/2000 | Raymond et al. |
| 6,161,102 | A | 12/2000 | Yanagihara et al. |
| 6,175,867 | B1 | 1/2001 | Taghadoss |
| 6,192,472 | B1 | 2/2001 | Garay et al. |
| 6,243,091 | B1 | 6/2001 | Berstis |
| 6,243,720 | B1 * | 6/2001 | Munter et al. ................ 707/741 |
| 6,278,992 | B1 * | 8/2001 | Curtis et al. ................. 707/711 |
| 6,292,810 | B1 | 9/2001 | Richards |
| 6,356,885 | B2 | 3/2002 | Ross et al. |
| 6,389,419 | B1 * | 5/2002 | Wong et al. .................. 709/245 |
| 6,408,294 | B1 | 6/2002 | Getchius et al. |
| 6,408,301 | B1 * | 6/2002 | Patton et al. ................. 707/741 |
| 6,457,017 | B2 * | 9/2002 | Watkins et al. .............. 707/696 |
| 6,493,761 | B1 | 12/2002 | Baker et al. |
| 6,499,105 | B1 | 12/2002 | Yoshiura et al. |
| 6,515,681 | B1 | 2/2003 | Knight |
| 6,516,320 | B1 * | 2/2003 | Odom et al. .................. 707/747 |
| 6,523,026 | B1 | 2/2003 | Gillis |
| 6,539,024 | B1 | 3/2003 | Janoska et al. |
| 6,571,275 | B1 | 5/2003 | Dong et al. |
| 6,598,033 | B2 | 7/2003 | Ross et al. |
| 6,662,176 | B2 | 12/2003 | Brunet et al. |
| 6,691,209 | B1 | 2/2004 | O'Connell |
| 6,771,595 | B1 | 8/2004 | Gilbert et al. |
| 6,772,214 | B1 | 8/2004 | McClain et al. |
| 6,785,815 | B1 | 8/2004 | Serret-Avila et al. |
| 6,820,082 | B1 | 11/2004 | Cook et al. |
| 6,857,011 | B2 | 2/2005 | Reinke |
| 6,937,257 | B1 | 8/2005 | Dunlavey |
| 6,950,864 | B1 * | 9/2005 | Tsuchiya .................... 709/223 |
| 6,978,297 | B1 | 12/2005 | Piersol |
| 7,020,654 | B1 | 3/2006 | Najmi |
| 7,020,661 | B1 | 3/2006 | Cruanes et al. |
| 7,062,572 | B1 | 6/2006 | Hampton |
| 7,072,967 | B1 | 7/2006 | Saulpaugh et al. |
| 7,082,443 | B1 | 7/2006 | Ashby |
| 7,093,288 | B1 | 8/2006 | Hydrie et al. |
| 7,130,587 | B2 | 10/2006 | Hikokubo et al. |
| 7,158,983 | B2 | 1/2007 | Willse et al. |
| 7,185,073 | B1 * | 2/2007 | Gai et al. .................... 709/221 |
| 7,185,192 | B1 | 2/2007 | Kahn |
| 7,219,131 | B2 | 5/2007 | Banister et al. |
| 7,219,134 | B2 | 5/2007 | Takeshima et al. |
| 7,243,120 | B2 | 7/2007 | Massey |
| 7,246,236 | B2 | 7/2007 | Stirbu |
| 7,254,562 | B2 | 8/2007 | Hsu et al. |
| 7,266,845 | B2 | 9/2007 | Hypponen |
| 7,277,957 | B2 | 10/2007 | Rowley et al. |
| 7,290,048 | B1 | 10/2007 | Barnett et al. |
| 7,296,070 | B2 | 11/2007 | Sweeney et al. |
| 7,296,088 | B1 | 11/2007 | Padmanabhan et al. |
| 7,299,277 | B1 | 11/2007 | Moran et al. |
| 7,373,500 | B2 | 5/2008 | Ramelson et al. |
| 7,424,744 | B1 | 9/2008 | Wu et al. |
| 7,426,181 | B1 | 9/2008 | Feroz et al. |
| 7,434,058 | B2 | 10/2008 | Ahuja et al. |
| 7,477,780 | B2 | 1/2009 | Boncyk et al. |
| 7,483,916 | B2 | 1/2009 | Lowe et al. |
| 7,493,659 | B1 | 2/2009 | Wu et al. |
| 7,506,055 | B2 | 3/2009 | McClain et al. |
| 7,509,677 | B2 | 3/2009 | Saurabh et al. |
| 7,516,492 | B1 | 4/2009 | Nisbet et al. |
| 7,551,629 | B2 | 6/2009 | Chen et al. |
| 7,596,571 | B2 | 9/2009 | Sifry |
| 7,664,083 | B1 | 2/2010 | Cermak et al. |
| 2001/0037324 | A1 | 11/2001 | Agrawal et al. |
| 2002/0032677 | A1 | 3/2002 | Morgenthaler et al. |
| 2002/0052896 | A1 | 5/2002 | Streit et al. |
| 2002/0078355 | A1 | 6/2002 | Samar |
| 2002/0091579 | A1 | 7/2002 | Yehia et al. |
| 2002/0103876 | A1 | 8/2002 | Chatani et al. |
| 2002/0107843 | A1 | 8/2002 | Biebesheimer et al. |
| 2002/0116124 | A1 | 8/2002 | Garin et al. |
| 2002/0126673 | A1 | 9/2002 | Dagli et al. |
| 2002/0129140 | A1 | 9/2002 | Peled et al. |
| 2002/0159447 | A1 | 10/2002 | Carey et al. |
| 2003/0009718 | A1 | 1/2003 | Wolfgang et al. |
| 2003/0028493 | A1 | 2/2003 | Tajima |
| 2003/0028774 | A1 | 2/2003 | Meka |
| 2003/0046369 | A1 | 3/2003 | Sim et al. |
| 2003/0053420 | A1 | 3/2003 | Duckett et al. |
| 2003/0065571 | A1 | 4/2003 | Dutta |
| 2003/0084300 | A1 | 5/2003 | Koike |
| 2003/0084318 | A1 | 5/2003 | Schertz |
| 2003/0084326 | A1 | 5/2003 | Tarquini |
| 2003/0093678 | A1 | 5/2003 | Bowe et al. |
| 2003/0099243 | A1 | 5/2003 | Oh et al. |
| 2003/0105739 | A1 | 6/2003 | Essafi et al. |
| 2003/0131116 | A1 | 7/2003 | Jain et al. |
| 2003/0135612 | A1 | 7/2003 | Huntington |
| 2003/0185220 | A1 | 10/2003 | Valenci |
| 2003/0196081 | A1 | 10/2003 | Savarda et al. |
| 2003/0204741 | A1 | 10/2003 | Schoen et al. |
| 2003/0221101 | A1 | 11/2003 | Micali |
| 2003/0225796 | A1 | 12/2003 | Matsubara |
| 2003/0225841 | A1 | 12/2003 | Song et al. |
| 2003/0231632 | A1 | 12/2003 | Haeberlen |
| 2004/0059736 | A1 | 3/2004 | Willse et al. |
| 2004/0071164 | A1 | 4/2004 | Baum |
| 2004/0111678 | A1 | 6/2004 | Hara |
| 2004/0114518 | A1 | 6/2004 | MacFaden et al. |
| 2004/0117414 | A1 | 6/2004 | Braun et al. |
| 2004/0120325 | A1 | 6/2004 | Ayres |
| 2004/0122863 | A1 | 6/2004 | Sidman |
| 2004/0181513 | A1 | 9/2004 | Henderson et al. |
| 2004/0181690 | A1 | 9/2004 | Rothermel et al. |
| 2004/0194141 | A1 | 9/2004 | Sanders |
| 2004/0196970 | A1 | 10/2004 | Cole |
| 2004/0230572 | A1 | 11/2004 | Omoigui |
| 2004/0267753 | A1 | 12/2004 | Hoche |
| 2005/0004911 | A1 | 1/2005 | Goldberg et al. |
| 2005/0021715 | A1 | 1/2005 | Dugatkin et al. |
| 2005/0021743 | A1 | 1/2005 | Fleig et al. |
| 2005/0022114 | A1 | 1/2005 | Shanahan et al. |
| 2005/0027881 | A1 | 2/2005 | Figueira et al. |
| 2005/0033747 | A1 | 2/2005 | Wittkotter |
| 2005/0033803 | A1 | 2/2005 | Vleet et al. |
| 2005/0038809 | A1 | 2/2005 | Abajian et al. |
| 2005/0050205 | A1 | 3/2005 | Gordy et al. |
| 2005/0055327 | A1 | 3/2005 | Agrawal et al. |
| 2005/0055399 | A1 | 3/2005 | Savchuk |
| 2005/0091443 | A1 | 4/2005 | Hershkovich et al. |
| 2005/0091532 | A1 | 4/2005 | Moghe |
| 2005/0097441 | A1 | 5/2005 | Herbach et al. |
| 2005/0108244 | A1 | 5/2005 | Riise et al. |
| 2005/0114452 | A1 | 5/2005 | Prakash |
| 2005/0120006 | A1 | 6/2005 | Nye |
| 2005/0127171 | A1 | 6/2005 | Ahuja et al. |
| 2005/0128242 | A1 | 6/2005 | Suzuki |
| 2005/0131876 | A1 | 6/2005 | Ahuja et al. |
| 2005/0132034 | A1 | 6/2005 | de la Iglesia et al. |
| 2005/0132046 | A1 | 6/2005 | de la Iglesia et al. |
| 2005/0132197 | A1 | 6/2005 | Medlar |
| 2005/0132198 | A1 | 6/2005 | Ahuja et al. |
| 2005/0132297 | A1 | 6/2005 | Milic-Frayling et al. |
| 2005/0138242 | A1 | 6/2005 | Pope et al. |
| 2005/0138279 | A1 | 6/2005 | Somasundaram |

| | | |
|---|---|---|
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1* | 1/2006 | Cook ............................ 726/25 |
| 2006/0021050 A1* | 1/2006 | Cook et al. .................... 726/25 |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0083180 A1 | 4/2006 | Baba et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0094394 A1 | 4/2007 | Singh et al. |
| 2007/0110089 A1 | 5/2007 | Essafi et al. |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |

OTHER PUBLICATIONS

"Computer program product for analyzing network traffic", *Ethereal. Computer program product for analyzing network traffic*, pp. 17-26 http://web.archive.org/web/20030315045117/www.ethereal.com/distribution/docs/user-guide.

Microsoft Outlook, Out look, copyright 1995-2000, 2 pages.

Preneel, Bart, "Cryptographic Hash Functions", Proceedings of the 3$^{rd}$ Symposium on State and Progress of Research in Cryptography, 1993, pp. 161-171.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

U.S. Appl. No. 12/690,153, filed Jan. 20, 2010, entitled "Query Generation for a Capture System," Inventor(s) Erik de la Iglesia, et al.

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.

U.S. Appl. No. 12/873,860, filed Sep. 1, 2010, entitled "A System and Method for Word Indexing in a Capture System and Querying Thereof," Inventor(s) William Deninger, et al. (P018-CON).

U.S. Appl. No. 12/829,220, filed Jul. 1, 2010, entitled "Verifying Captured Objects Before Presentation," Inventor(s) Rick Lowe, et al. (P008-CON).

U.S. Appl. No. 12/873,061, filed Aug. 31, 2010, entitled "Document Registration," Inventor(s) Ratinder Paul Singh Ahuja, et al. (P007-CON).

"Computer program product for analyzing network traffic", *Ethereal. Computer program product for analyzing network traffic*, pp. 17-26 http://web.archive.org/web/20030315045117/www.ethereal.com/distribution/docs/user-guide. Approximated copyright 2004-2005, printed Mar. 12, 2009.

U.S. Appl. No. 12/751,876, filed Mar. 31, 2010, entitled "Attributes of Captured Objects in a Capture System," Inventor(s) William Deninger, et al. (P019-DIV).

* cited by examiner

TAG DATA STRUCTURE FOR MAINTAINING RELATIONAL DATA OVER CAPTURED OBJECTS

PRIORITY AND RELATED APPLICATIONS

This patent application is related to, incorporates by reference, and claims the priority benefit of U.S. Provisional Application 60/528,680, entitled "TAG DATA STRUCTURE FOR MAINTAINING RELATIONAL DATA OVER CAPTURED APPLICATION DATA", filed Dec. 10, 2003, and of U.S. Provisional Application 60/528,644, entitled "VERIFYING CAPTURED OBJECTS BEFORE PRESENTATION", filed Dec. 10, 2003.

FIELD OF THE INVENTION

The present invention relates to computer networks, and in particular, to capturing and indexing objects in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network.

SUMMARY OF THE INVENTION

Content leaving a local network can be captured. Objects captured over a network by a capture system can be indexed to provide enhanced search and content analysis capabilities. In one embodiment the objects can be indexed using a data structure having a source address field to indicate an origination address of the object, a destination address field to indicate a destination address of the object, a source port field to indicate an origination port of the object, a destination port field to indicate a destination port of the object, a content field to indicate a content type from a plurality of content types identifying a type of content contained in the object, and a time field to indicate when the object was captured. The data structure may also store a cryptographic signature of the object to ensure the object is not altered after capture.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
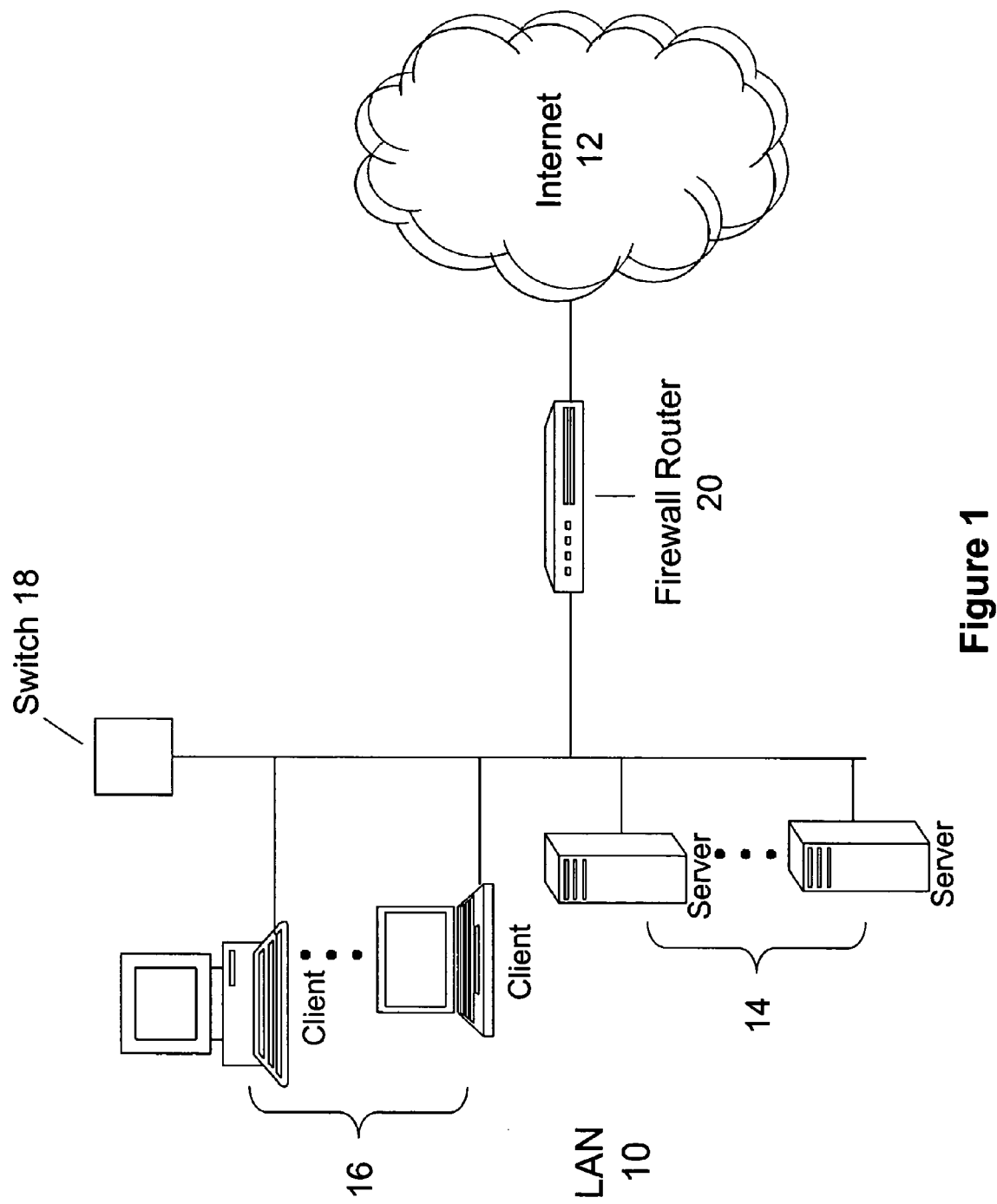
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyse, and searchably store the content contained in the forwarded packets.

Figure 2:
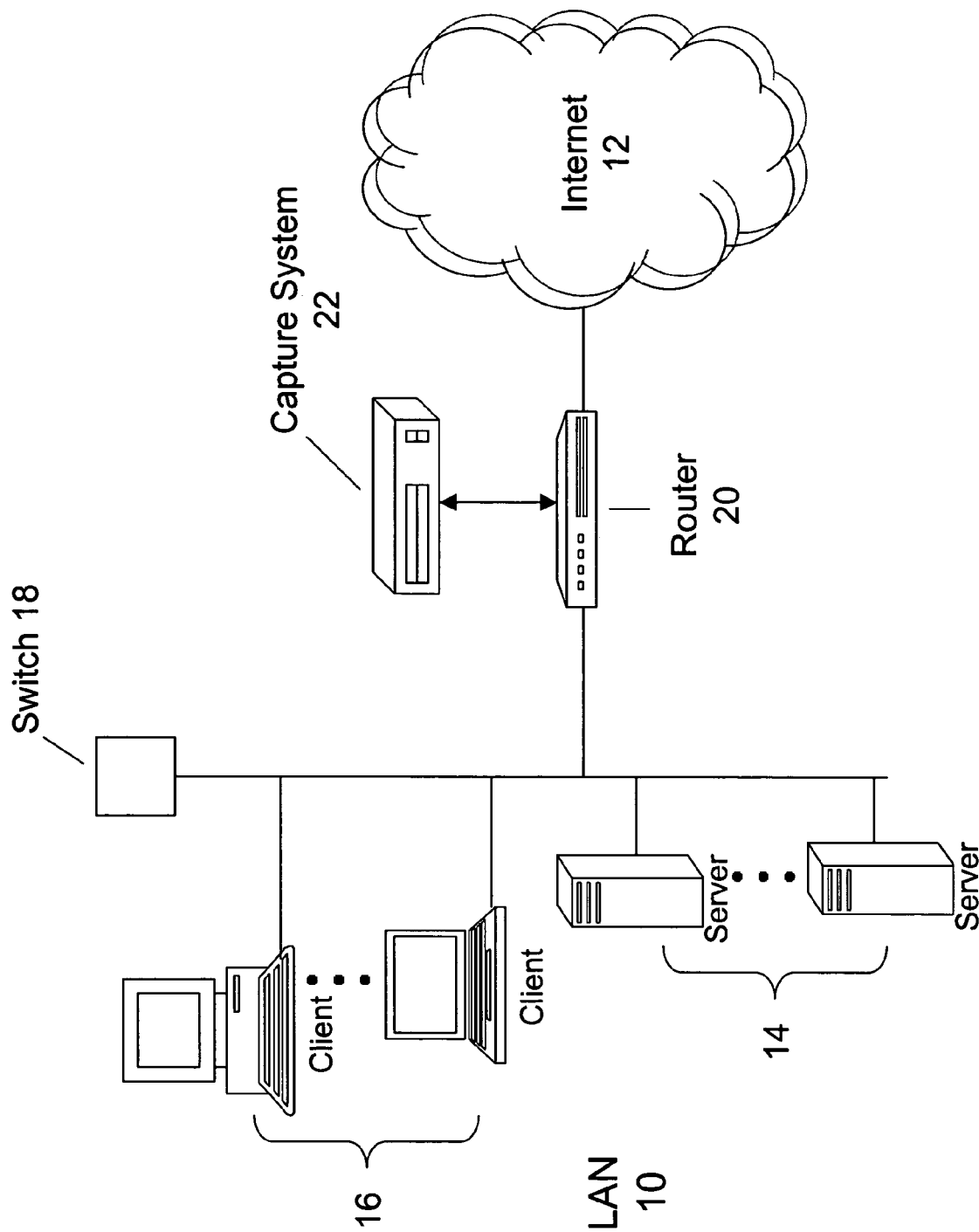
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
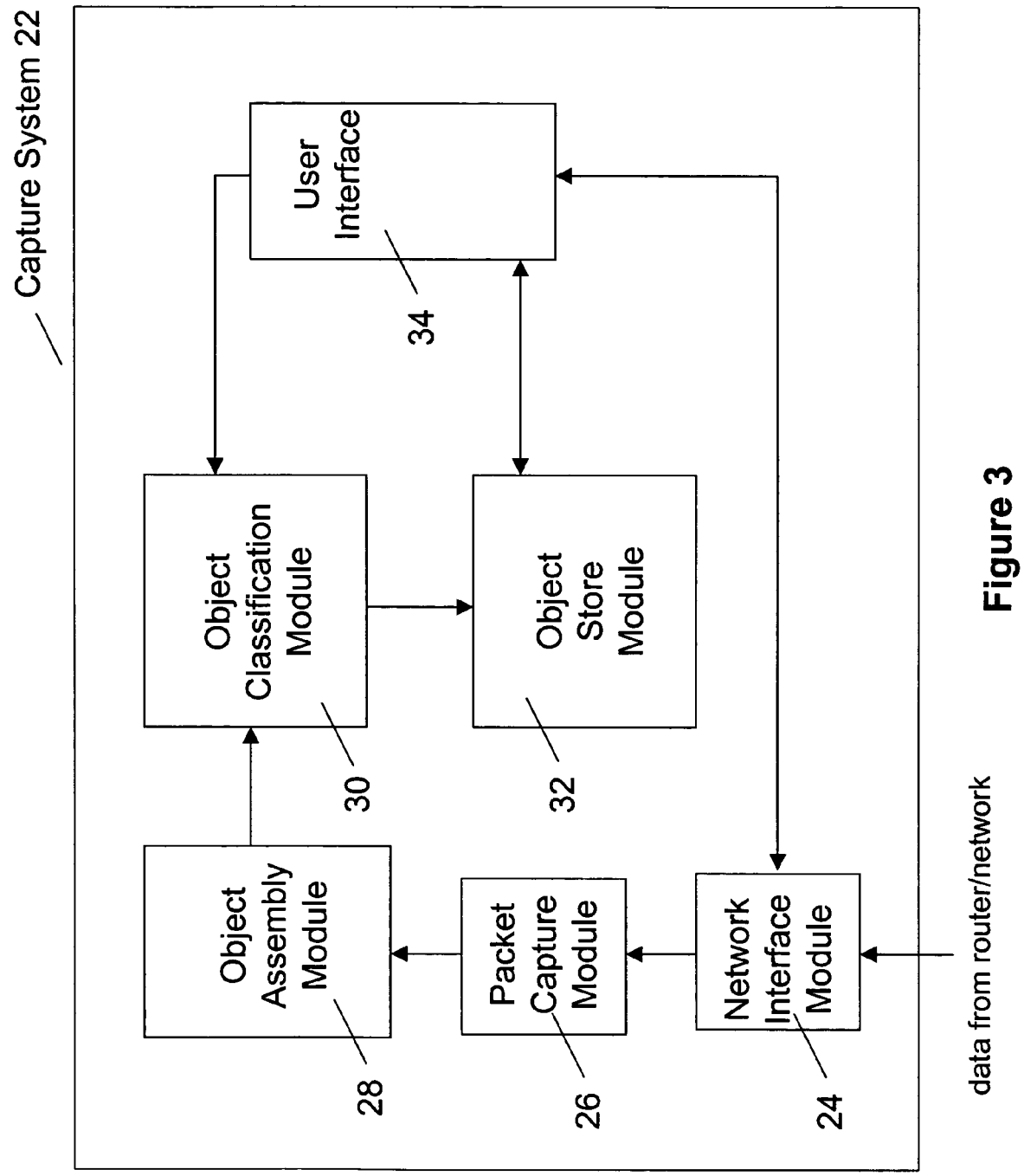
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 is also sometimes referred to as a content analyzer, content or data analysis system, and other similar names. In one embodiment, the capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
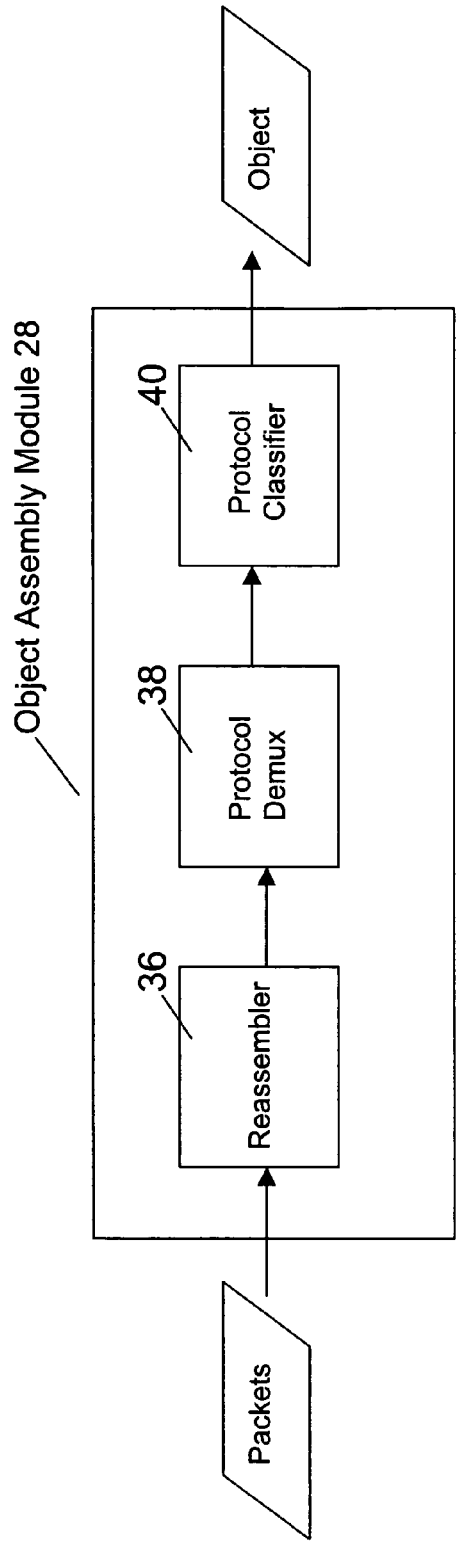
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
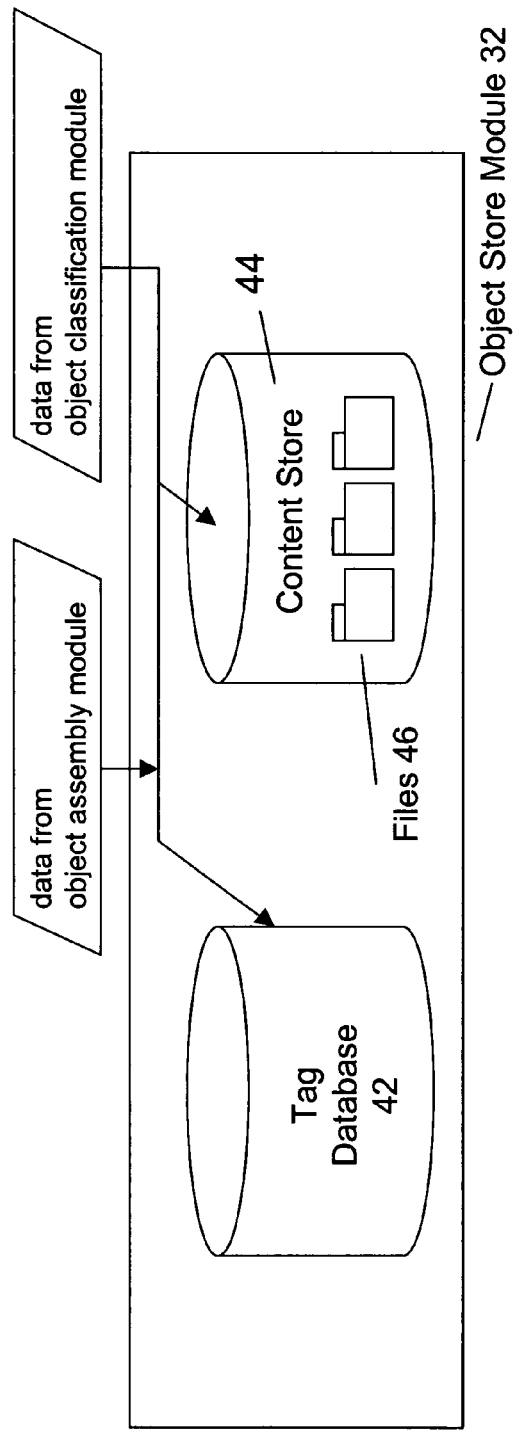
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object.

An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |

TABLE 2-continued

| Field Name | Definition |
| --- | --- |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labelled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); C++ Source, C Source, FORTRAN Source, Verilog Source (for source or design code authored in these high-level programming languages); C Shell, K Shell, Bash Shell (for shell program scripts); Plaintext (for otherwise unclassified textual objects); Crypto (for objects that have been encrypted or that contain cryptographic elements); Binary Unknown, ASCII Unknown, and Unknown (as catchall categories).

The signature contained in the Signature and Tag Signature fields can be any digest or hash over the object, or some portion thereof. In one embodiment, a well known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Figure 7:
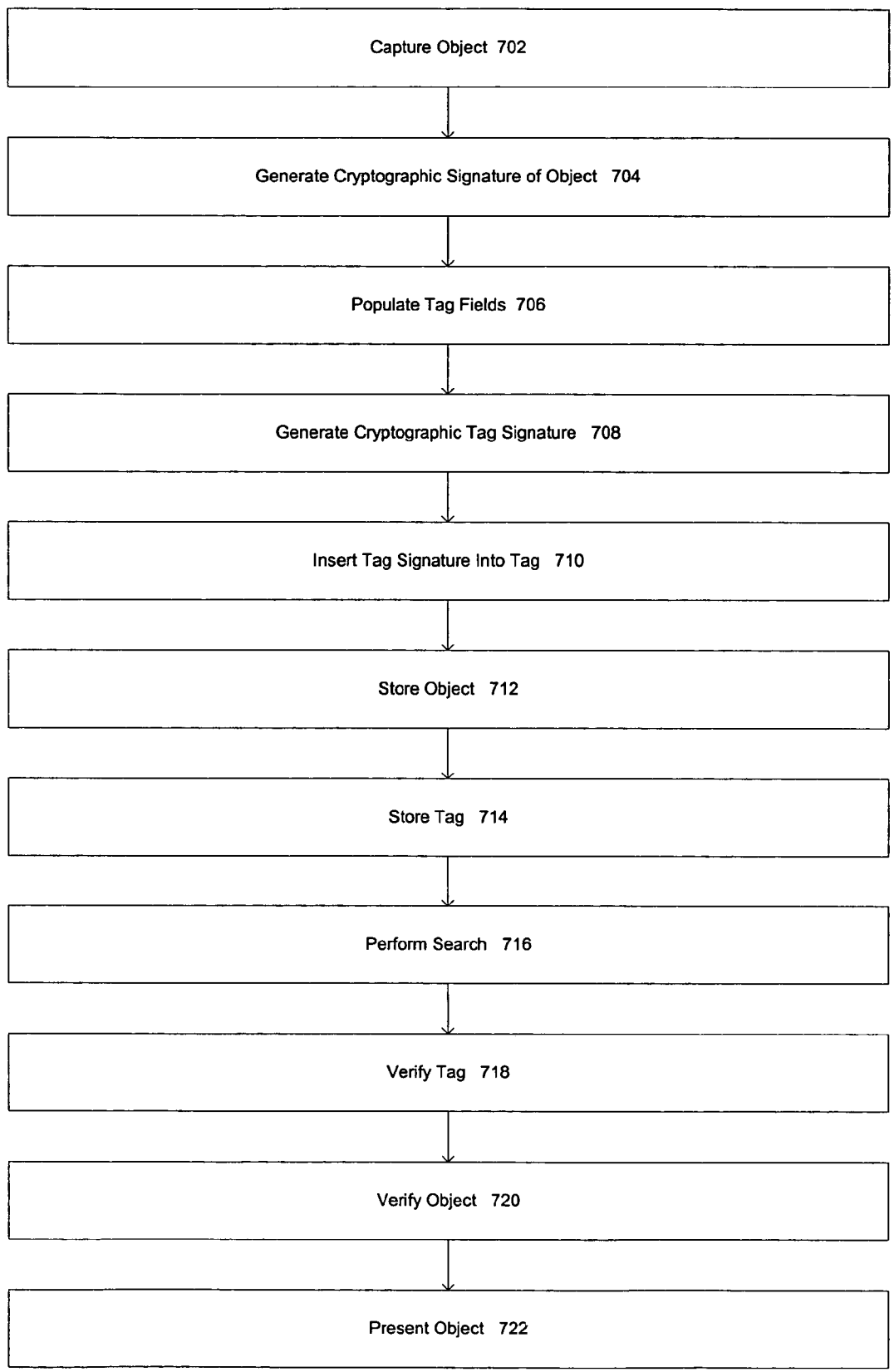
FIG. 7 is a flow diagram illustrating object verification according to one embodiment of the present invention.

One embodiment of a process for using the cryptographic signatures is shown in flow chart form in FIG. 7. Blocks 702-714 describe object capture, while blocks 716-722 describe object presentation. First, in block 702, the object is captured by the capture system 22 described above. Then, in block 704, the digital cryptographic signature is generated, e.g., by hashing the object and signing the hash with the private key of the capture system 22. In block 706, all the information gathered by the object assembly module 28 and the object classification module 30 are used to populate the tag fields described above, such as "Source IP," "Content," "Size," and the digital cryptographic signature is inserted into the appropriate "Signature" field.

In block 708, the cryptographic tag signature over the tag is generated using any known cryptographic method, such as the one used to generate the cryptographic signature over the object in block 704. The cryptographic tag signature is then inserted, in block 710, into the tag in the appropriate "Tag Signature" field. In block 712, the object is stored, e.g., in the content store 44, and in block 714, the tag indexing the object is stored, e.g., in the tag database 42.

The object and its corresponding tag maintaining the relational data over the object remain stored. Eventually, in block 716, a search—also sometimes referred to as a mine—is performed over one or more of the tag fields that results in a hit on the tag. For example, the tag indicates a particular source IP in the "Source IP" field that was indicated by the search. Next, in block 718, the tag is verified to ensure that it has not been modified since initial storage in block 714. This can be done by cryptographically verifying the tag signature generated in block 708. For example, the tag signature can be decrypted with the public key of the capture system 22 and compared to a new hash of the tag fields. Other verifications are possible depending on how the tag signature was generated.

In block 720, the object itself is verified by retrieving the object and cryptographically verifying the digital cryptographic signature stored in the "Signature" field. This can be done similarly to the verification of the tag signature in block 718. In both object and tag signature check out, that is, if neither the object nor the tag has been modified since original storage in blocks 712 and 714 respectively, then the object is presented, in bock 722, to the user. Presenting the object can include any method of delivery, including displaying the object to the user via the user interface 34. If either object or tag has been modified, that is, at least one of the signatures does not check out, the object can still be presented in block 722, but a warning or alert can also be appended to bring the modification to the users attention.

User Interface

Referring again to FIG. 3, in one embodiment, the objects and tags stored in the object store module 32 can be interactively queried by a user via the user interface 34. In one embodiment the user interface can interact with a web server (not shown) to provide the user with Web-based access to the capture system 22. The objects in the content store module 32 can thus be searched for specific textual or graphical content using exact matches, patterns, keywords, and various other advanced attributes.

For example, the user interface 34 can provide a query-authoring tool (not shown) to enable users to create complex searches of the object store module 32. These search queries can be provided to a data mining engine (not shown) that parses the queries, scans the tag database 42, and retrieves the found object from the content store 44. Then, these objects that matched the specific search criteria in the user-authored query can be counted and displayed to the user by the user interface 34.

Searches can also be scheduled to occur at specific times or at regular intervals, that is, the user interface 34 can provide access to a scheduler (not shown) that can periodically execute specific queries. Reports containing the results of these searches can be made available to the user at a later time, mailed to the administrator electronically, or used to generate an alarm in the form of an e-mail message, page, syslog or other notification format.

In several embodiments, the capture system 22 has been described above as a stand-alone device. However, the capture system of the present invention can be implemented on any appliance capable of capturing and analysing data from a network. For example, the capture system 22 described above could be implemented on one or more of the servers 14 or clients 16 shown in FIG. 1. The capture system 22 can interface with the network 10 in any number of ways, including wirelessly.

Figure 6:
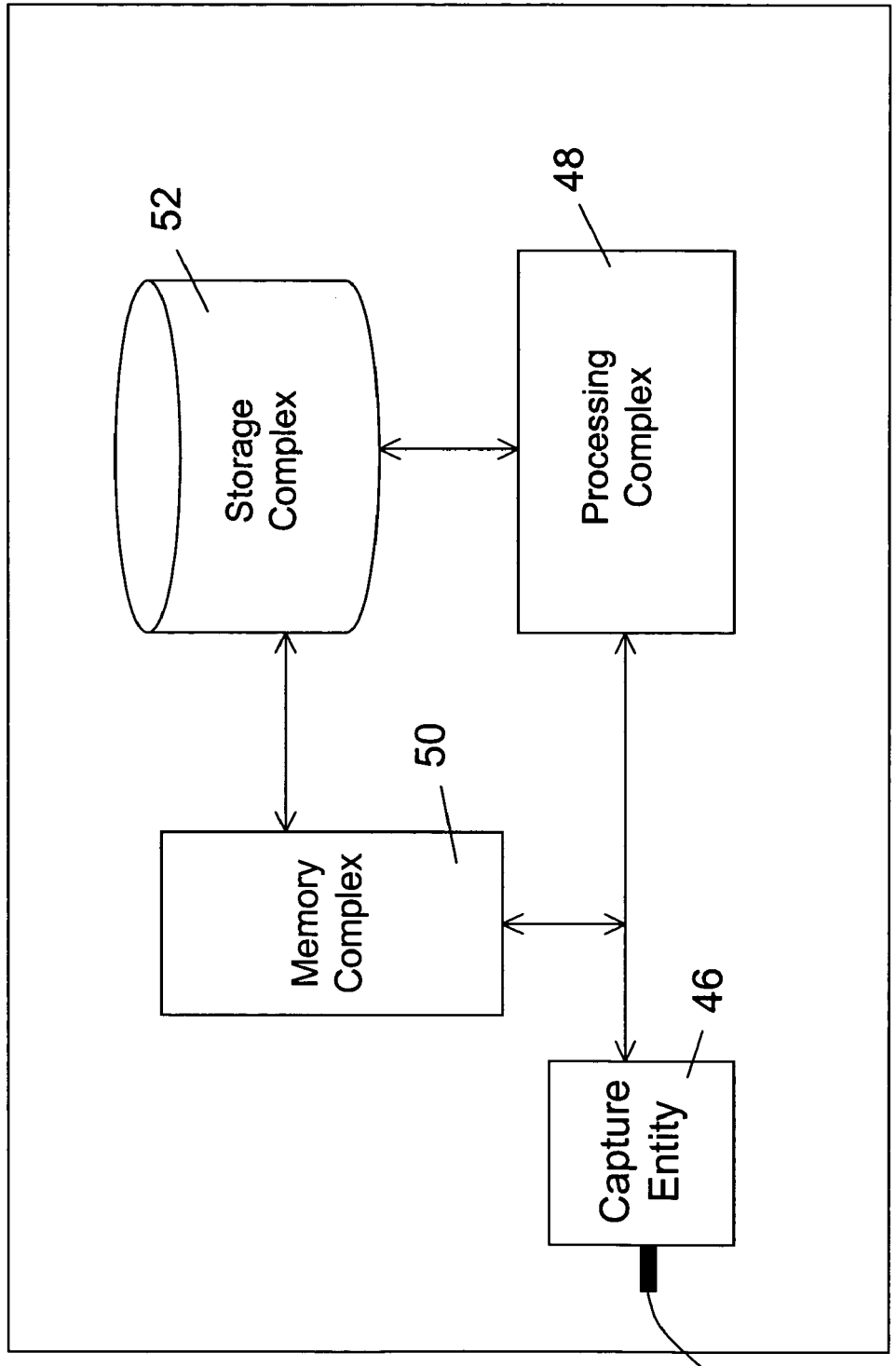
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and content analyser have been described. In the forgoing description, various specific values were given names, such as "packets," and various specific modules, such as the "object assembly module" and "object store module" have been described. However, these names are merely to describe and illustrate various aspects of the present invention, and in no way limit the scope of the present invention. Furthermore, various modules, such as the object store module 32 and the object classification module 30 in FIG. 3, can be implemented as software or hardware modules, or without dividing their functionalities into modules at all. The present invention is not limited to any modular architecture either in software or in hardware, whether described above or not.

What is claimed is:

1. A computer readable medium having stored thereon data representing instructions that, when executed by a processor, cause the processor to perform operations comprising:
   generating a tag describing an object of a communication captured during transmission of the communication from an origination address to a destination address, extracted from the communication, and stored in a memory block, wherein the tag includes,
      a source address field to indicate an origination address of the object,
      a destination address field to indicate a destination address of the object,
      a source port field to indicate an origination port of the object,
      a destination port field to indicate a destination port of the object,
      a content field to indicate a content type from a plurality of content types identifying a type of content contained in the object, and
      a time field to indicate when the object was captured; and
   storing the tag in a database, wherein the tag indexes the object in the memory block, the tag being stored to allow subsequent searching for the object based on one or more of the fields, wherein the fields are obtained from the communication, and wherein the object is part of a document captured based on a capture rule that defines which objects are to be captured, wherein the capture rule is part of a default rule set for a capture system configured to monitor network traffic, and wherein a determination is made based on the capture rule to discard or to store the document, and wherein the capture rule identifies a first internet protocol (IP) address from which the document was sent and a second IP address associated with an intended destination of the document.

2. The computer readable medium of claim 1, wherein the plurality of content types comprises JPEG, GIF, BMP, TIFF, PNG, Skintone, PDF, MSWord, Excel, PowerPoint, MSOffice, HTML, WebMail, SMTP, Telnet, Rlogin, FTP, Chat, GZIP, ZIP, TAR, C++Source, C Source, FORTRAN Source, Verilog Source, C Shell, K Shell, Bash Shell, Plaintext, Crypto, LIF, Binary Unknown, ASCII Unknown, and Unknown.

3. The computer readable medium of claim 1, further comprising generating a device identity field to indicate a device that captured the object.

4. The computer readable medium of claim 1, further comprising generating a protocol field to indicate the protocol that carried the object.

5. The computer readable medium of claim 1, further comprising an instance field to indicate a number of the object in a connection.

6. The computer readable medium of claim 1, further comprising generating an encoding field to indicate a how the object was encoded.

7. The computer readable medium of claim 1, further comprising generating a size field to indicate the size of the object.

8. The computer readable medium of claim 1, further comprising generating an owner field to indicate an entity that requested capture of the object.

9. The computer readable medium of claim 1, further comprising generating a capture rule field to indicate a rule that triggered capture of the object.

10. The computer readable medium of claim 1, further comprising generating a signature field to store a signature of the object.

11. The computer readable medium of claim 10, wherein the signature comprises a digital cryptographic signature.

12. The computer readable medium of claim 1, further comprising generating a tag signature field to store a signature of the data structure.

13. The computer readable medium of claim 12, wherein the tag signature comprises a digital cryptographic signature.

14. A computer readable medium having stored thereon data representing instructions that, when executed by a processor, cause the processor to perform operations comprising:
   storing data associated with an object of a communication captured during transmission of the communication from an origination address to a destination address, extracted from the communication, and stored in a memory block by a capture system to create a tag that indexes the object in the memory block, the data comprising:
      an Ethernet controller MAC address of the capture system that captured the object;
      a source Ethernet IP address of the object;
      a destination Ethernet IP address of the object;
      a source TCP/IP port number of the object;
      a destination TCP/IP port number of the object.
      an IP protocol that carried the object when captured by the capture system;
      a canonical count of a number of the object within a TCP/IP connection;

a content type of the object;
an encoding that was used on the object;
a size of the object;
a timestamp indicating when the capture system captured the object;
a user who requested capture of the object;
a capture rule that directed capture of the object;
a hash signature of the object; and
a hash signature of the tag, the tag being stored to allow subsequent searching for the object based on one or more of the fields, wherein the IP addresses are obtained from the communication, and wherein the object is part of a document captured based on a capture rule that defines which objects are to be captured, wherein the capture rule is part of a default rule set for the capture system configured to monitor network traffic, and wherein a determination is made based on the capture rule to discard or to store the document, and wherein the capture rule identifies a first internet protocol (IP) address from which the document was sent and a second IP address associated with an intended destination of the document.

15. The computer readable medium of claim 14, wherein the hash signature of the object comprises a digital cryptographic signature of the object.

16. The computer readable medium of claim 15, wherein the hash signature of the tag comprises a digital cryptographic signature of the tag.

17. The computer readable medium of claim 14, wherein the content type of the object is one of JPEG, GIF, BMP, TIFF, PNG, Skintone, PDF, MSWord, Excel, PowerPoint, MSOffice, HTML, WebMail, SMTP, Telnet, Rlogin, FTP, Chat, GZIP, ZIP, TAR, C++Source, C Source, FORTRAN Source, Verilog Source, C Shell, K Shell, Bash Shell, Plaintext, Crypto, LIF, Binary Unknown, ASCII Unknown, and Unknown.

18. A method to index a captured object, comprising:
generating for storage of objects of a communication captured during transmission of the communication from an origination address to a destination address, extracted from the communication, and stored in a memory block:
a source address field to indicate an origination address of the object;
a destination address field to indicate a destination address of the object;
a source port field to indicate an origination port of the object;
a destination port field to indicate a destination port of the object;
a content field to indicate a content type from a plurality of content types identifying a type of content contained in the object; and
a time field to indicate when the object was captured; and
storing data in the fields to create a tag, the tag indexing the objects in the memory block, the tag being stored to allow subsequent searching for the objects based on one or more of the fields, wherein the fields are obtained from the communication, and wherein the object is part of a document captured based on a capture rule that defines which objects are to be captured, wherein the capture rule is part of a default rule set for a capture system configured to monitor network traffic, and wherein a determination is made based on the capture rule to discard or to store the document, and wherein the capture rule identifies a first internet protocol (IP) address from which the document was sent and a second IP address associated with an intended destination of the document.

19. A method to index a captured object, comprising:
storing data associated with an object of a communication captured during transmission of the communication from an origination address to a destination address, extracted from the communication, and stored in a memory block by a capture system to create a tag indexing the object in the memory block, the data comprising:
an Ethernet controller MAC address of the capture system that captured the object;
a source Ethernet IP address of the object;
a destination Ethernet IP address of the object;
a source TCP/IP port number of the object;
a destination TCP/IP port number of the object;
an IP protocol that carried the object when captured by the capture system;
a canonical count of a number of the object within a TCP/IP connection;
a content type of the object;
an encoding that was used on the object;
a size of the object;
a timestamp indicating when the capture system captured the object;
a user who requested capture of the object;
a capture rule that directed capture of the object;
a hash signature of the object; and
a hash signature of the tag, the tag being stored to allow subsequent searching for the object based on one or more of the fields, wherein the IP addresses are obtained from the communication, and wherein the object is part of a document captured based on a capture rule that defines which objects are to be captured, wherein the capture rule is part of a default rule set for the capture system configured to monitor network traffic, and wherein a determination is made based on the capture rule to discard or to store the document, and wherein the capture rule identifies a first internet protocol (IP) address from which the document was sent and a second IP address associated with an intended destination of the document.

* * * * *